(12) United States Patent
Sahu et al.

(10) Patent No.: US 12,315,380 B2
(45) Date of Patent: May 27, 2025

(54) ADJUSTING AIRCRAFT GROUND MOVEMENT ROUTES

(71) Applicant: HONEYWELL INTERNATIONAL INC., Charlotte, NC (US)

(72) Inventors: Bijaya Kumar Sahu, Charlotte, NC (US); Dinesh Ramalingam, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 303 days.

(21) Appl. No.: 17/929,189

(22) Filed: Sep. 1, 2022

(65) Prior Publication Data

US 2023/0062680 A1  Mar. 2, 2023

(30) Foreign Application Priority Data

Sep. 1, 2021 (IN) .............................. 202111039543

(51) Int. Cl.
*G08G 5/51* (2025.01)
*G06F 3/0486* (2013.01)
*G06F 3/0488* (2022.01)

(52) U.S. Cl.
CPC .............. *G08G 5/51* (2025.01); *G06F 3/0486* (2013.01); *G06F 3/0488* (2013.01); *G06F 2203/04806* (2013.01)

(58) Field of Classification Search
CPC ....... G08G 5/51; G06F 3/0486; G06F 3/0488; G06F 2203/04806; G06F 3/04842;
(Continued)

(56) References Cited

U.S. PATENT DOCUMENTS 8,401,775 B2 * 3/2013 Rozovski ............. G08G 5/0082
340/972
10,037,705 B1 * 7/2018 Kalyan ................ G08G 5/0026
(Continued)

OTHER PUBLICATIONS

Benko, et al., "Design and Evaluation of Interaction Models for Multi-touch Mice"; Conference: Proceedings of the Graphics Interface 2010 Conference, May 31-Jun. 2 (Sep. 2010) (8 pgs) https://www.microsoft.com/en-us/research/wp-content/uploads/2016/10/Benko_GI2010.pdf.
(Continued)

*Primary Examiner* — Michael C Zarroli
(74) *Attorney, Agent, or Firm* — Brooks, Cameron & Huebsch, PLLC (57) ABSTRACT

Devices, methods, and systems for adjusting aircraft ground movement routes are described herein. One device includes a user interface, a memory, and a processor configured to execute executable instructions stored in the memory to receive a touch selection of a portion of an aircraft ground movement route displayed in the map of the airfield and a touch drag of the selected portion of the route to a different intersection of the airfield displayed in the map, display, responsive to the selected portion of the route being touch dragged to the different intersection of the airfield, a zoomed-in view of the different intersection, receive a touch selection of a portion of the different intersection in the zoomed-in view, adjust the aircraft ground movement route according to the received touch selection of the portion of the different intersection, and display, in the map, the adjusted aircraft ground movement route.

19 Claims, 3 Drawing Sheets

(58) Field of Classification Search
CPC .............. G06F 3/04845; G06F 3/04883; G06F 2203/04808; A23B 40/00; B65D 83/204; H10D 30/0327; H10D 64/311
See application file for complete search history.

(56) References Cited

U.S. PATENT DOCUMENTS

| | | | |
|---|---|---|---|
| 2005/0283305 A1* | 12/2005 | Clark ................... | G01C 23/00 340/972 |
| 2011/0199239 A1* | 8/2011 | Lutz .................... | G08G 5/0021 340/995.14 |
| 2016/0328977 A1* | 11/2016 | Lueck ................... | G01C 21/20 |
| 2018/0374370 A1* | 12/2018 | Hvezda ................ | G08G 5/0043 |
| 2020/0349855 A1* | 11/2020 | Sinha ................... | G08G 5/065 |

OTHER PUBLICATIONS

Moscovich, "Principles and Applications of Multi-touch Interaction"; Brown University, May 2007 (114 pgs) http://www.moscovich.net/tomer/papers/moscovich_dissertation.pdf.

* cited by examiner

ADJUSTING AIRCRAFT GROUND MOVEMENT ROUTES

CROSS-REFERENCE TO RELATED APPLICATIONS

This application claims priority pursuant to 35 U.S.C. 119(a) to Indian Application No. 202111039543, filed Sep. 1, 2021, which application is incorporated herein by reference in its entirety.

TECHNICAL FIELD

The present disclosure relates to devices, methods, and systems for adjusting aircraft ground movement routes.

BACKGROUND

An important part of ground operations at an airport is routing aircraft from one part of the airport to another, such as, for instance, routing the aircraft between the gate and the runway. These ground movement routes may be directed (e.g., supervised, controlled, and/or adjusted) by air traffic control (ATC) at the airport to ensure the ground traffic at the airport is safe and efficient. For example, ATC may need to adjust the ground movement route of an aircraft to account for high ground traffic occurring at an area of the airport, to avoid an obstacle present at an area of the airport, etc.

DETAILED DESCRIPTION

Devices, methods, and systems for adjusting aircraft ground movement routes are described herein. For example, one or more embodiments include a user interface, a memory, a processor configured to execute executable instructions stored in the memory to receive a touch selection of a portion of an aircraft ground movement route displayed in the map of the airfield and a touch drag of the selected portion of the route to a different intersection of the airfield displayed in the map, display, responsive to the selected portion of the route being touch dragged to the different intersection of the airfield, a zoomed-in view of the different intersection, receive a touch selection of a portion of the different intersection in the zoomed-in view, adjust the aircraft ground movement route according to the received touch selection of the portion of the different intersection, and display, in the map, the adjusted aircraft ground movement route.

An air traffic control (ATC) system, such as, for instance, an advanced surface movement guidance and control system (ASMGCS), can display for the air traffic controller a map of the airfield of the airport, along with the current locations of the aircraft in the airfield and their existing routes. In some approaches, the air traffic controller can use drag and drop functionality in the map to adjust (e.g., edit) the existing route of the aircraft. For example, the air traffic controller can touch (e.g., tap) a portion (e.g., branch) of an existing aircraft ground movement route displayed in the map, and then drag (e.g., swipe) that portion of the route to a different (e.g., new) location in the map, and the ATC system can adjust the route of the aircraft accordingly.

In some instances, however, such drag and drop functionality may not provide a safe and/or efficient way for the air traffic controller to adjust the existing route of the aircraft. For example, a complex intersection of the airfield may have multiple taxiway centerlines that are close to each other. In such instances, it may be difficult for the ATC system to recognize which portion of the intersection the air traffic controller is intending to route the aircraft through, and the ATC system may select the wrong route (e.g., a route different than what the controller was intending). Further, in such instances, it may take the air traffic controller more time to adjust the route, which can cause the air traffic controller to experience more "head down time". For instance, the air traffic controller may need to do multiple touch operations and/or make multiple manual selections to complete the adjustment to the route.

Embodiments of the present disclosure, in contrast, can provide a safe and efficient way for an air traffic controller to adjust the existing route of the aircraft using drag and drop functionality, even in situations in which the adjustment involves a complex intersection with multiple taxiway centerlines that are close together. For example, embodiments of the present disclosure can easily recognize which portion of the intersection the air traffic controller is intending to route the aircraft through, and accordingly can reliably make the correct adjustment to the route (e.g., the adjustment intended by the controller). Further, embodiments of the present disclosure can reduce the amount of time it takes the air traffic controller to adjust the route, which can reduce the "head down time" of the controller.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things, and "a plurality of" something can refer to two or more such things. For example, "a number of routes" can refer to one or more routes, and "a plurality of routes" can refer to two or more routes.

Figure 1:
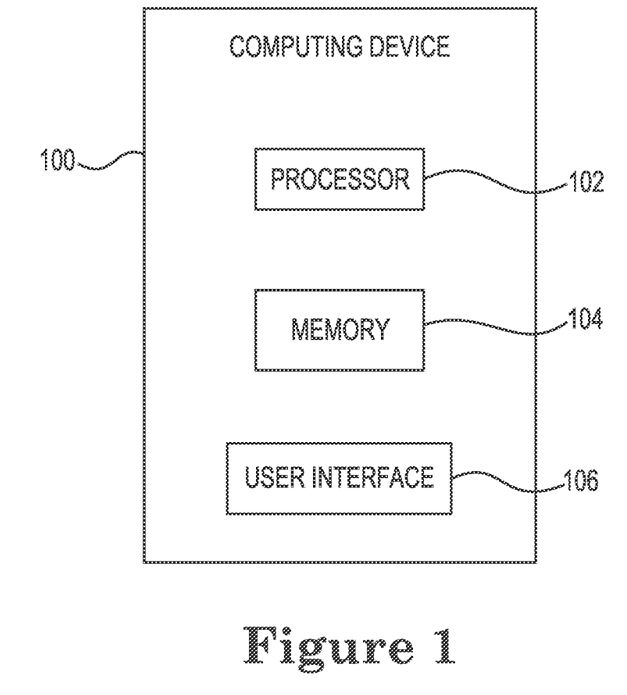
FIG. 1 illustrates a computing device for adjusting aircraft ground movement routes in accordance with one or more embodiments of the present disclosure.

FIG. 1 illustrates a computing device 100 for adjusting aircraft ground movement routes in accordance with one or more embodiments of the present disclosure. As used herein, the term "computing device" refers to an electronic system having a processing resource, memory resource, and/or an application-specific integrated circuit (ASIC) that can process information. For example, computing device 100 can be a laptop computer, notebook computer, desktop computer, server, networking equipment (e.g., router, switch, etc.), or mobile device (e.g., smart phone, tablet, PDA, etc.), among other types of computing devices. However, embodiments of the present disclosure are not limited to a particular type of computing device. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

In some embodiments, computing device 100 can be located at an airport. For example, computing device 100 can be a computing device of an advanced surface movement guidance and control system (ASMGCS) of the airport. The computing device 100 can enable a user, such as an air traffic controller, ground controller, and/or any other type of user to utilize the computing device 100 for adjusting aircraft ground movement routes at the airport according to embodiments of the present disclosure.

As shown in FIG. 1, computing device 100 can include a memory 104 and a processor 102. Memory 104 can be any type of storage medium that can be accessed by processor 102 to perform various examples of the present disclosure. For example, memory 104 can be a non-transitory computer readable medium having computer readable instructions (e.g., computer program instructions) stored thereon that are executable by processor 102 to adjust aircraft ground movement routes in accordance with the present disclosure. That is, processor 102 can execute the executable instructions stored in memory 104 to adjust aircraft ground movement routes in accordance with the present disclosure.

Memory 104 can be volatile or nonvolatile memory. Memory 104 can also be removable (e.g., portable) memory, or non-removable (e.g., internal) memory. For example, memory 104 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 104 is illustrated as being located in computing device 100, embodiments of the present disclosure are not so limited. For example, memory 104 can also be located internal to another computing resource (e.g., enabling computer readable instructions to be downloaded over the Internet or another wired or wireless connection).

As shown in FIG. 1, computing device 100 can include a user interface 106. A user (e.g., operator) of computing device 100, such as, for instance, an air traffic controller of the airport, can interact with computing device 100 via user interface 106. For example, user interface 106 can provide (e.g., display and/or present) information to the user of computing device 100, such as, for instance, a map of the airfield of the airport, as will be further described herein. Further, user interface 106 can receive information from (e.g., input by) the user of computing device 100, as will be further described herein.

In some embodiments, user interface 106 can be a graphical user interface (GUI) that can include a display (e.g., a screen) that can provide and/or receive information to and/or from the user of computing device 100. The display can be, for instance, a touch-screen (e.g., the GUI can include touch-screen capabilities). As an additional example, user interface 106 can include a keyboard and/or mouse the user can use to input information into computing device 100. Embodiments of the present disclosure, however, are not limited to a particular type(s) of user interface.

As an example, user interface 106 can display a map of the airfield of the airport. The map can be an interactive map that can include, for instance, the runways and taxiways of the airfield, the runway and taxiway markings of the airfield, the taxiway centerlines of the airfield, aircraft gates of the airfield, current locations of aircraft in the airfield, and/or existing (e.g., planned) ground movement routes of the aircraft through the airfield, among other information associated with the airfield. An example of such a map will be further described herein (e.g., in connection with FIG. 2A).

The aircraft ground movement routes can be displayed in the map as, for instance, dashed lines (e.g., if the route is a proposed route that has not yet been accepted by the user) or solid lines (e.g., if the route is a cleared route that has been accepted by the user) from the start point of the route to the end point of the route. Further, the ground movement route of a particular aircraft may be displayed in the map responsive to a touch selection of that aircraft (e.g., of an icon representing that aircraft) displayed in the map. For instance, the user (e.g., air traffic controller) can tap the aircraft icon on the screen, and the ground movement route of that aircraft can then be displayed in the map responsive to the tap. In some embodiments, the ground movement route of an aircraft may only be displayed in the map responsive to a selection of that aircraft (e.g., the ground movement route of an aircraft may not be displayed in the map unless the user selects that aircraft).

Computing device 100 can receive, via user interface 106, a touch selection of a portion (e.g., branch) of an aircraft ground movement route displayed in the map (e.g., the ground movement route of the aircraft selected by the user), and a touch drag of the selected portion of the route to a different intersection of the airfield displayed in the map. For instance, the user can tap the portion of the route on the screen, and then swipe the selected portion of the route to the different intersection of the screen. As an example, the selected portion of the route can be and/or include an intersection of the airfield through which the route currently passes, and the different intersection can be an intersection through which the route does not currently pass (e.g., but through which the user would like the route to pass through).

Responsive to the selected portion of the route being touch dragged to the different intersection of the airfield, computing device 100 can display, on user interface 106, a zoomed-in view of the different intersection. The zoomed-in view of the different intersection can comprise, for example, a zoom window that includes the zoomed-in view of the different intersection and is displayed within the display of the map (e.g., over a portion of the map in the display). Further, the zoomed-in view can include a plurality of portions of the different intersection such, for instance, points in the different intersection and/or the segments (e.g., branch segments) of the different intersection. An example of such a zoomed-in view will be further described herein (e.g., in connection with FIG. 2B).

In some embodiments, computing device 100 can automatically display the zoomed-in view of the different intersection on user interface 106 responsive to the selected portion of the route being touch dragged to the different intersection. In some embodiments, computing device 100 can determine whether to display the zoomed-in view of the different intersection on user interface 106 responsive to the selected portion of the route being touch dragged to the different intersection, and display the zoomed-in view of the different intersection on user interface 106 responsive to determining to display the zoomed-in view (e.g., computing device 100 may refrain from displaying a zoomed-in view of the different intersection on user interface 106 responsive to determining not to display the zoomed-in view).

Computing device 100 can determine whether to display the zoomed-in view of the different intersection based, for example, on whether the different intersection is one of a number of pre-defined intersections for which a zoomed-in view is to be displayed. For instance, the intersections to be zoomed in on can be pre-defined (e.g., by the user) and stored in memory 104, and if the different intersection is one of those pre-defined intersections (e.g., responsive to computing device 100 determining the different intersection is one of the pre-defined intersections), the zoomed-in view of that intersection can be displayed.

As an additional example, computing device 100 can determine whether to display the zoomed-in view of the different intersection based on the characteristics (e.g., complexity) of that intersection, such as, for instance, the quantity of portions (e.g., points and/or segments) that intersection includes. For instance, the intersections to be zoomed in on can be intersections having a certain (e.g., threshold) number of portions, and if the different intersection is one of those intersections (e.g., responsive to computing device determining the quantity of portions of the different intersection meets or exceeds the threshold), the zoomed-in view of that intersection can be displayed.

As an additional example, computing device 100 can determine whether to display the zoomed-in view of the different intersection based on previous aircraft ground movement route adjustments. For instance, computing device 100 can use machine learning to determine which intersections of the airfield may be causing problems and/or making it difficult for the air traffic controller to adjust aircraft ground movement routes based on, for example, the number of times an adjustment through an intersection has been previously made and/or the amount of time it has taken the air traffic controller to make the previous route adjustments through that intersection, and if the different intersection is one of those intersections, the zoomed-in view of that intersection can be displayed.

Computing device 100 can receive, via user interface 106, a touch selection of a portion of the different intersection in the zoomed-in view (e.g., a touch selection of one of the plurality of portions of the different intersection included in the zoomed-in view). For instance, the user can tap the portion of the different intersection on the screen. As an example, the selected portion of the different intersection can be the portion (e.g., the point and/or branch segment) of the different intersection the user would like the aircraft ground movement route to pass through.

Computing device 100 can adjust (e.g., modify, edit, and/or change) the aircraft ground movement route according to the received touch selection of the portion of the different intersection. For instance, computing device 100 can adjust the aircraft ground movement route to include (e.g., pass through) the selected portion of the different intersection, while still including the same start point and end point of the original (e.g., pre-adjusted) route.

Computing device 100 can then display, in the map of the airfield on user interface 106, the adjusted aircraft ground movement route. For instance, the adjusted route can be displayed as a dashed line in the map from the start point to the end point. Further, the original route (e.g., the portion of the original route that is not a part of the adjusted route) can continue to be displayed in the map along with the adjusted route. For instance, the original route can be displayed as a solid line in the map for the portion of the original route that is not a part of the adjusted route.

As an example, computing device 100 can remove the zoomed-in view of the different intersection from the display on user interface 106 (e.g., the display can return to the full view of the map of the airfield) after receiving the touch selection of the portion of the different intersection, and the adjusted route can be displayed in the map (e.g., the entire adjusted route can be displayed in the full view of the map) along with the original route. As an additional example, the zoomed-in view of the different intersection can remain in the display on user interface 106, and the adjusted route (e.g., the portion of the adjusted route that passes through the intersection) can be displayed in the zoomed-in view along with the original route.

Computing device 100 can receive, via user interface 106, an acceptance of the adjusted aircraft ground movement route displayed in the map. The acceptance can comprise, for example, a touch selection of the adjusted route displayed in the map. For instance, the user can tap a portion of the adjusted route on the screen to accept the route. Responsive to receiving the acceptance of the adjusted route, the adjusted route displayed in the map can change from a dashed line to a solid line, and the original route (e.g., the portion of the original route that is not a part of the adjusted route) can be removed from the map. Further, computing device 100 can send (e.g., transmit, via a network) the adjusted route to the aircraft (e.g., to the pilot of the aircraft) responsive to receiving the acceptance of the adjusted route.

If the user (e.g., air traffic controller) wishes to make an additional (e.g., further) adjustment to the route, the above process can be repeated. For example, computing device 100 can receive, via user interface 106, a touch selection of a portion of the adjusted aircraft ground movement route displayed in the map, and a touch drag of the selected portion of the adjusted route to another different intersection of the airfield displayed in the map, in a manner analogous to that previously described herein. Responsive to the selected portion of the adjusted route being touched dragged to the other different intersection of the airfield, computing device 100 can display (e.g., automatically display, or determine whether to display), on user interface 106, a zoomed-in view of the other different intersection, in a manner analogous to that previously described herein. Computing device 100 can receive, via user interface 106, a touch selection of a portion of the other different intersection in the zoomed-in view, and adjust (e.g., make another adjustment to) the adjusted aircraft ground movement route according to the selected portion of the other different intersection, in a manner analogous to that previously described herein. Computing device 100 can display, in the map on user interface 106, the twice adjusted aircraft ground movement route, and receive an acceptance of the twice adjusted route, in a manner analogous to that previously described herein.

Figure 2A:
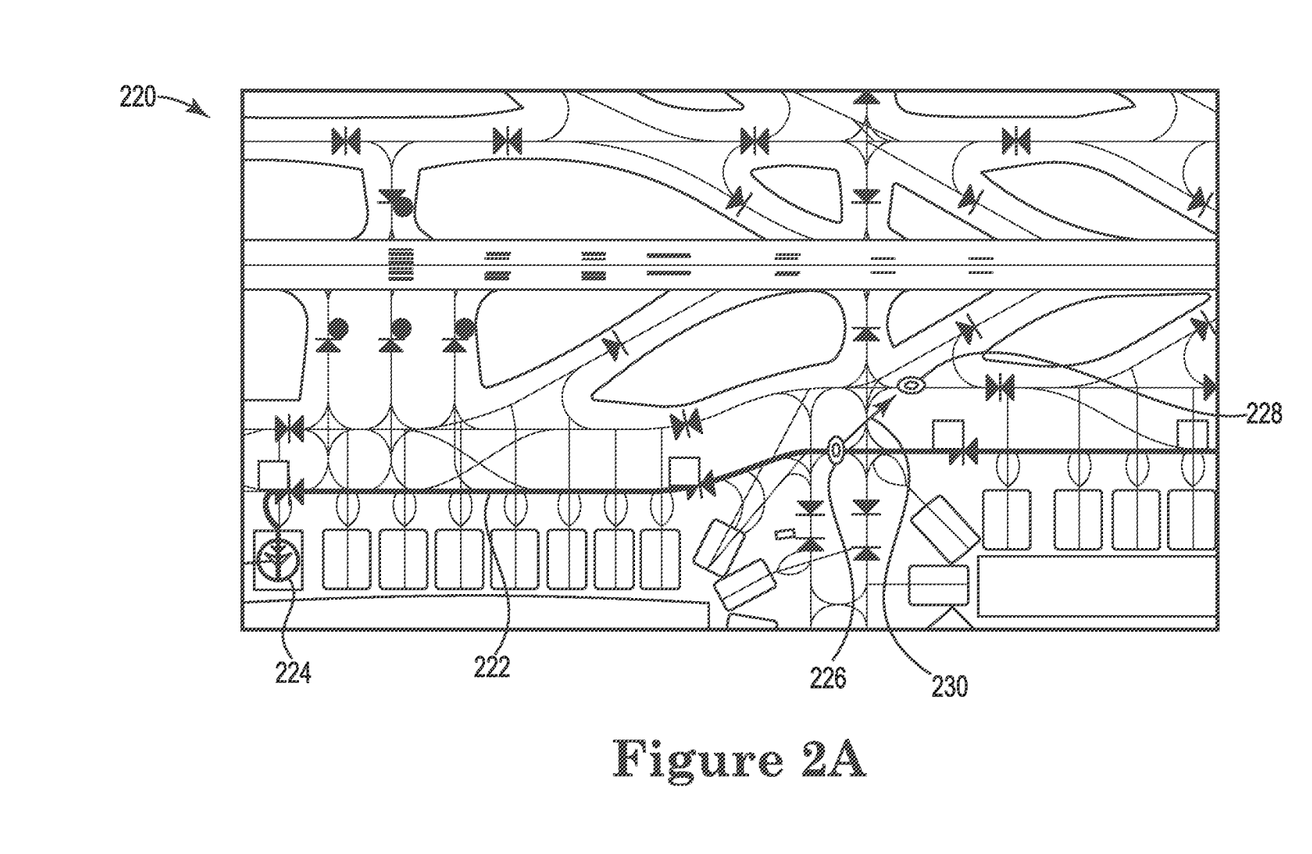
FIG. 2A illustrates an example display for adjusting aircraft ground movement routes in accordance with one or more embodiments of the present disclosure.
Figure 2B:
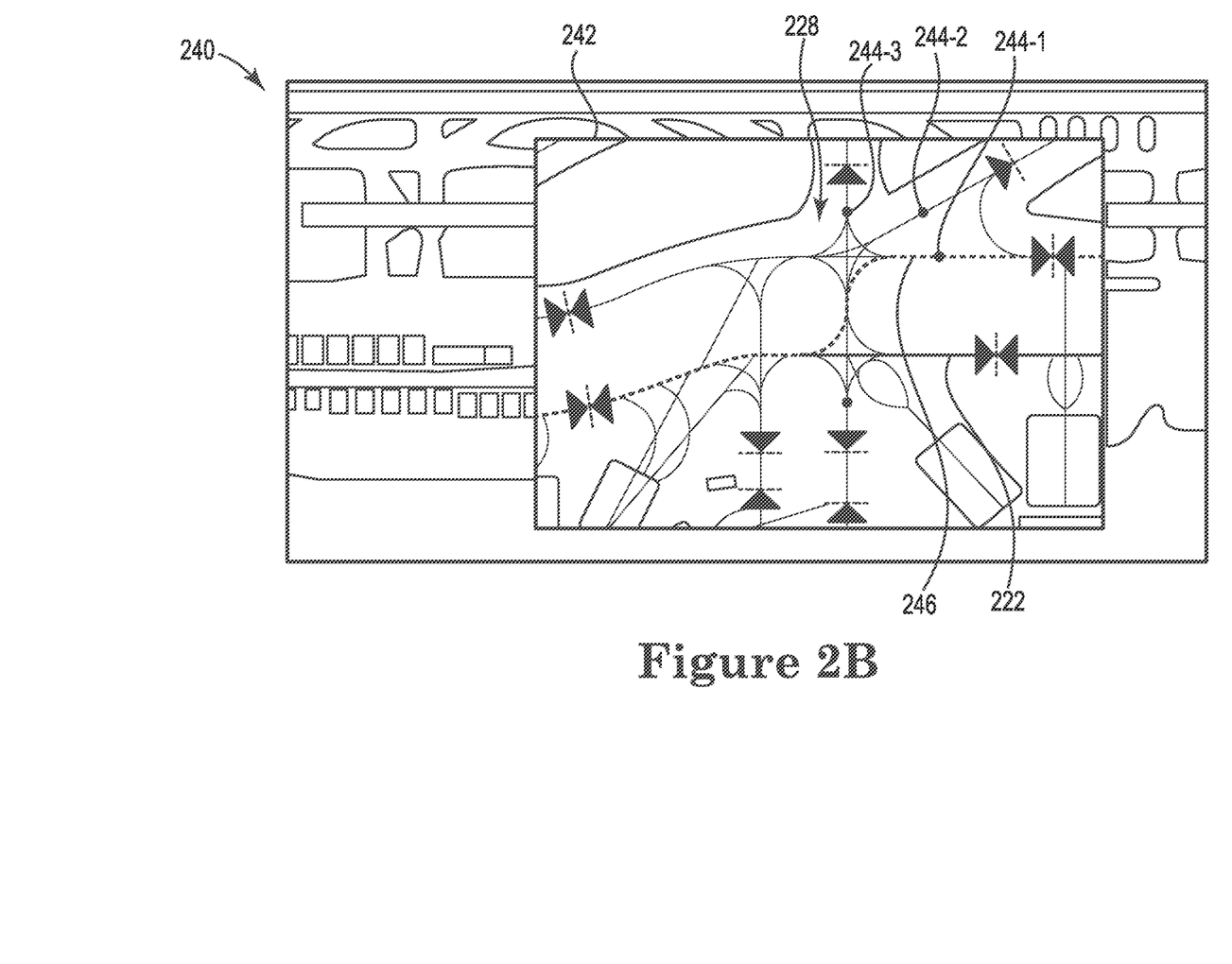
FIG. 2B illustrates an example display for adjusting aircraft ground movement routes in accordance with one or more embodiments of the present disclosure.

FIG. 2A illustrates an example display (e.g., screen shot of a display) 220 for adjusting aircraft ground movement routes in accordance with one or more embodiments of the present disclosure. FIG. 2B illustrates an example display 240 for adjusting aircraft ground movement routes in accordance with one or more embodiments of the present disclosure. Displays 220 and 240 illustrated in FIGS. 2A and 2B, respectively, can be displayed, for example, on user interface 106 of computing device 100 previously described in connection with FIG. 1.

As shown in FIG. 2A, display 220 includes a map of an airfield (e.g., a portion of the airfield) of an airport. The map can be an interactive map that can include, for instance, the runways and taxiways of the airfield, the runway and taxiway markings of the airfield, the taxiway centerlines of the airfield, aircraft gates of the airfield, current locations of aircraft in the airfield, and/or existing (e.g., planned) ground movement routes of the aircraft through the airfield, as illustrated in FIG. 2A.

For instance, in the example shown in FIG. 2A, the map includes an aircraft 224 (e.g., an icon representing the aircraft) that is currently located at a gate of the airfield, and an existing (e.g., planned) ground movement route 222 (e.g., a portion of the route) for aircraft 224 in the form of a solid line through the airfield. The route 222 may be displayed in the map responsive to a touch selection of aircraft 224 in the map, as previously described herein (e.g., in connection with FIG. 1).

In the example illustrated in FIG. 2A, the route 222 passes through intersection 226 of the airfield, but does not pass through intersection 228 of the airfield. However, a user (e.g., air traffic controller) would like to adjust the route 222 to pass through intersection 228. Accordingly, the user can make a touch selection of (e.g., tap) a portion of route 222 (e.g., the portion that passes through intersection 226), and make a touch drag of (e.g. swipe) the selected portion of route 222 to intersection 228, as previously described herein (e.g., in connection with FIG. 1). The touch drag of the selected portion of route 222 to intersection 228 is represented by arrow 230 illustrated in FIG. 2A.

Responsive to the selected portion of route 222 being touch dragged to intersection 228, a zoomed-in view (e.g., zoom window) 242 of intersection 228 can be provided within the map in display 240, as illustrated in FIG. 2B and previously described herein (e.g., in connection with FIG. 1). For example, zoomed-in view 242 can include a plurality of portions 244-1, 244-2, 244-3 of intersection 228, which can be, for instance, different points in and/or different segments (e.g., branch segments) of, intersection 228, as illustrated in FIG. 2B.

The user can make a touch selection of (e.g., tap) one of the plurality of portions 244-1, 244-2, 244-3 of intersection 228 in zoomed-in view 242 that the user would like the route to pass through, as previously described herein (e.g., in connection with FIG. 1). For instance, in the example illustrated in FIG. 2B, the user can select portion 244-1.

In response to the selection of portion 244-1, the route can be adjusted to pass through portion 244-1, and the adjusted route 246 can be displayed in zoomed-in view 242, as illustrated in FIG. 2B and previously described herein (e.g., in connection with FIG. 1). In the example illustrated in FIG. 2B, the adjusted route 246 is displayed as a dashed line in zoomed-in view 242. Further, the original route 222 (e.g., the portion of the original route 222 that is not a part of adjusted route 246) can continue to be displayed in zoomed-in view 242 along with adjusted route 246, as illustrated in FIG. 2B and previously described herein (e.g., in connection with FIG. 1). In the example illustrated in FIG. 2B, the original route 222 is displayed as a solid line in zoomed-in view 242. Should the user wish to accept adjusted route 246, the user can make a touch selection of (e.g., tap) a portion of adjusted route 246 in zoomed-in view 242, as previously described herein (e.g., in connection with FIG. 1)

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for routing aircraft ground movements at an airport, comprising:
    a touch screen configured to display a map of an airfield of an airport;
    a memory; and
    a processor configured to execute executable instructions stored in the memory to:
        receive, via the touch screen:
            a touch selection on the touch screen of a portion of an aircraft ground movement route displayed in the map of the airfield; and
            a touch drag on the touch screen of the selected portion of the route to a different intersection of the airfield displayed in the map;
        display on the touch screen, responsive to the selected portion of the route being touch dragged on the touch screen to the different intersection of the airfield, a zoomed-in view of the different intersection, wherein the zoomed-in view of the different intersection includes a plurality of possible portions of the different intersection to select;
        receive, via the touch screen, a touch selection on the touch screen of a portion of the different intersection in the zoomed-in view, wherein the selected portion of the different intersection is one of the plurality of possible portions;
        adjust the aircraft ground movement route according to the received touch selection on the touch screen of the portion of the different intersection; and
        display, in the map on the touch screen, the adjusted aircraft ground movement route.

2. The computing device of claim 1, wherein the processor is configured to execute the instructions to automatically display the zoomed-in view of the different intersection on the touch screen responsive to the selected portion of the route being touch dragged on the touch screen to the different intersection of the airfield.

3. The computing device of claim 1, wherein the processor is configured to execute the instructions to:
   determine whether to display the zoomed-in view of the different intersection on the touch screen responsive to the selected portion of the route being touch dragged on the touch screen to the different intersection of the airfield; and
   display the zoomed-in view of the different intersection on the touch screen responsive to determining to display the zoomed-in view.

4. The computing device of claim 1, wherein the selected portion of the different intersection is a point in the different intersection.

5. The computing device of claim 1, wherein the selected portion of the different intersection is a segment of the different intersection.

6. The computing device of claim 1, wherein the zoomed-in view comprises a zoom window within the display of the map.

7. The computing device of claim 1, wherein the processor is configured to execute the instructions to display the aircraft ground movement route in the map responsive to a touch selection on the touch screen of the aircraft displayed in the map.

8. A method for routing aircraft ground movements at an airport, comprising:
   receiving, via a touch screen of a computing device:
      a touch selection on the touch screen of a portion of an aircraft ground movement route displayed in a map of an airfield of an airport on the touch screen; and
      a touch drag on the touch screen of the selected portion of the route to a different intersection of the airfield displayed in the map;
   displaying on the touch screen, responsive to the selected portion of the route being touch dragged on the touch screen to the different intersection of the airfield, a zoomed-in view of the different intersection, wherein the zoomed-in view includes a plurality of possible portions of the different intersection to select;
   receiving, via the touch screen, a touch selection on the touch screen of one of the plurality of possible portions of the different intersection in the zoomed-in view;
   adjusting, by the computing device, the aircraft ground movement route according to the selected portion of the different intersection; and
   displaying, in the map on the touch screen, the adjusted aircraft ground movement route.

9. The method of claim 8, wherein the method includes removing the zoomed-in view of the different intersection from the display on the touch screen after receiving the touch selection on the touch screen in the zoomed-in view.

10. The method of claim 8, wherein the method includes:
   receiving, via the touch screen:
      a touch selection on the touch screen of a portion of the adjusted aircraft ground movement route displayed in the map on the touch screen; and
      a touch drag on the touch screen of the selected portion of the adjusted route to another different intersection of the airfield displayed in the map;
   displaying on the touch screen, responsive to the selected portion of the adjusted route being touch dragged on the touch screen to the other different intersection of the airfield, a zoomed-in view of the other different intersection, wherein the zoomed-in view includes a plurality of portions of the other different intersection;
   receiving, via the touch screen, a touch selection on the touch screen of one of the plurality of portions of the other different intersection in the zoomed-in view;
   adjusting, by the computing device, the adjusted aircraft ground movement route according to the selected portion of the other different intersection; and
   displaying, in the map on the touch screen, the twice adjusted aircraft ground movement route.

11. The method of claim 8, wherein the method includes receiving, via the touch screen, an acceptance of the adjusted aircraft ground movement route displayed in the map.

12. The method of claim 11, wherein receiving the acceptance comprises receiving a touch selection on the touch screen of the adjusted aircraft ground movement route displayed in the map.

13. The method of claim 11, wherein the adjusted aircraft ground movement route displayed in the map changes from a dashed line to a solid line responsive to receiving the acceptance.

14. A non-transitory computer readable medium having computer readable instructions stored thereon that are executable by a processor to:
   display, on a touch screen, a map of an airfield of an airport;
   receive, via the touch screen:
      a touch selection on the touch screen of a portion of an aircraft ground movement route displayed in the map of the airfield; and
      a touch drag on the touch screen of the selected portion of the route to a different intersection of the airfield displayed in the map;
   determine, responsive to the selected portion of the route being touch dragged on the touch screen to the different intersection of the airfield, whether to display a zoomed-in view of the different intersection on the touch screen;
   display the zoomed-in view of the different intersection on the touch screen responsive to determining to display the zoomed-in view, wherein the zoomed-in view of the different intersection includes a plurality of possible portions of the different intersection to select;
   receive, via the touch screen, a touch selection on the touch screen of a portion of the different intersection in the zoomed-in view, wherein the selected portion of the different intersection is one of the plurality of possible portions;
   adjust the aircraft ground movement route according to the received touch selection on the touch screen of the portion of the different intersection; and
   display, in the map on the touch screen, the adjusted aircraft ground movement route.

15. The computer readable medium of claim 14, wherein the instructions are executable by the processor to refrain from displaying the zoomed-in view of the different intersection on the touch screen responsive to determining not to display the zoomed-in view.

16. The computer readable medium of claim 14, wherein the instructions are executable by the processor to determine whether to display the zoomed-in view of the different intersection based on whether the different intersection is one of a number of pre-defined intersections for which a zoomed-in view is to be displayed.

17. The computer readable medium of claim 14, wherein the instructions are executable by the processor to determine whether to display the zoomed-in view of the different intersection based on a quantity of possible portions of the different intersection to select.

18. The computer readable medium of claim 14, wherein the instructions are executable by the processor to determine whether to display the zoomed-in view of the different intersection based on previous aircraft ground movement route adjustments.

19. The computer readable medium of claim 14, wherein the instructions are executable by the processor to display the aircraft ground movement route and the adjusted aircraft ground movement route in the zoomed-in view of the different intersection.

\* \* \* \* \*